Jan. 18, 1944.　　　F. E. ARNDT　　　2,339,236
MATERIAL SPREADER
Original Filed June 30, 1939　　2 Sheets-Sheet 1

INVENTOR:
FRANKLIN E. ARNDT,
By Chas. M. Niesen,
ATT'Y

Jan. 18, 1944.                F. E. ARNDT                    2,339,236
                            MATERIAL SPREADER
                   Original Filed June 30, 1939    2 Sheets-Sheet 2
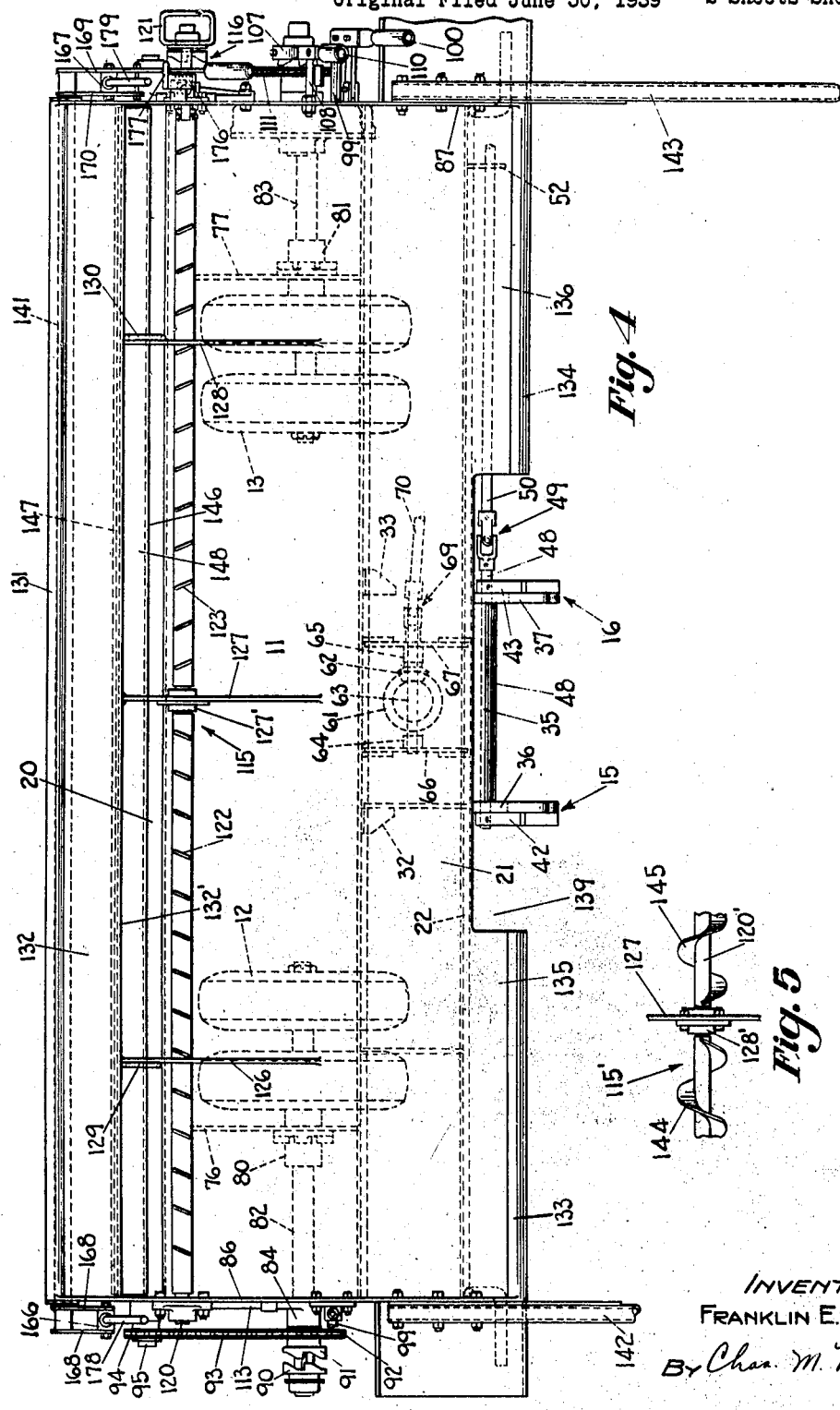
INVENTOR:
FRANKLIN E. ARNDT,
By Chas. M. Naeem,
ATTY.

Patented Jan. 18, 1944

2,339,236

UNITED STATES PATENT OFFICE 2,339,236

MATERIAL SPREADER

Franklin E. Arndt, Galion, Ohio, assignor to The Galion Iron Works & Manufacturing Company, a corporation of Ohio Original application June 30, 1939, Serial No. 282,242. Divided and this application October 10, 1940, Serial No. 360,588

20 Claims. (Cl. 275—2)

My invention relates to road material spreaders of the type which is adapted to be hitched to and hauled behind a dumping truck traveling along the roadway, and one of the objects of the invention is the provision of a rotary conveyor in the hopper of a spreader and having means for conveying toward the lateral ends of the spreader some of the material delivered to the open top of the hopper of the spreader.

Another object of the invention is the provision of improved mechanism for driving the feed roll of the spreader always in the same direction whether the spreader is pulled forwardly or pushed rearwardly and extending a driving connection from such feed roll to a rotary conveyor in the hopper of the spreader so that such rotary conveyor will also always be driven in the same direction irrespective of the direction of travel of the spreader.

Other objects of the invention will appear hereinafter, the novel features and combinations being set forth in the appended claims.

This application is a division of my co-pending application, Serial No. 282,242, filed June 30, 1939, for an improvement in a Material spreader, now Patent No. 2,309,086, granted January 26, 1943, as a continuation in part of my co-pending application Serial No. 131,837, filed March 19, 1937, for an improvement in Material spreaders, now Patent No. 2,252,690, granted August 19, 1941.

In the accompanying drawings,

Fig. 4 is a plan view of the spreader shown in front elevation in Fig. 1; and

Fig. 5 is a detail plan view of the modification comprising oppositely acting spiral conveyors which may be substituted for the oppositely acting paddles of the agitator shown in plan in Fig. 4;

Figures 1, 2, 3:
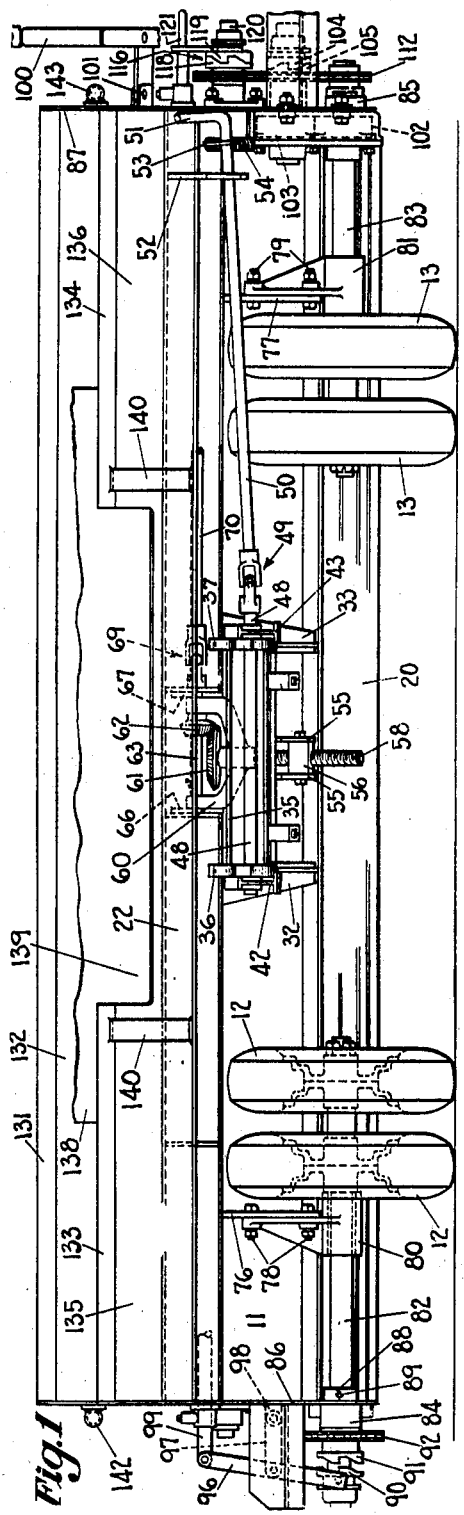
Fig. 1 is a front elevation of the spreader embodying my improvements.
Fig. 2 is an elevational view of the left-hand end of Fig. 1.
Fig. 3 is an elevational view of the right-hand end of Fig. 1.

The hopper 11, as shown in Figs. 1 and 4, is adapted to extend substantially beyond both sides of a draft vehicle or self-propelled hauling dumping truck. The hopper 11, as shown in Figs. 1 and 4, is supported upon the wheels 12, 13 which are set inwardly from the vertical end walls of the hopper so as to track just inside or just outside of the paths of travel of the wheels of the truck or draft vehicle. That is to say, when hitching devices 15 and 16 at the front side of the spreader are connected to the drawbar at the rear end of the dumping truck, the wheels 12 and 13 of the spreader will travel along paths immediately outside or immediately inside of the paths of travel of the wheels of the dumping truck.

The hopper 11 comprises an open top and an open bottom and below the latter is located the feed roll 20. The bottom wall 21 of the hopper slopes downwardly from the cross-piece 22 to the feed roll 20. On the underside of the bottom wall 21 are secured by means of welding, the bracket plates to which are pivoted the rearwardly extending arms 27, 28 of a U-shaped frame structure. This frame structure may comprise various plates welded together into one rigid unit.

Secured to the bottom of the hopper are vertical plates 32 and 33 at opposite sides of the frame structure, as shown in Fig. 1. The depending plates 32, 33 act as guiding abutments for the frame structure to confine the latter to upright adjustment on its pivots 25, 26.

Welded to the ends of the cross-piece 35 are the upright jaw plates 36, 37, each having spaced-apart upper and lower fixed jaws. The jaw plate 36 comprises the upper jaw 38 and the lower jaw 39, as shown in Fig. 2. The jaw plate 37 comprises the upper jaw 40 and the lower jaw 41, as shown in Fig. 3. The jaws 38, 39 and 40, 41 are beveled to facilitate positioning of the dumping truck drawbar.

On the outside of the jaw plates 36, 37 are located the beveled latch plates 42, 43, as shown in Fig. 4. The latch plates 42, 43 are beveled at 44, 45 respectively, as shown in Figs. 2 and 3. The latch plates are also provided with hooking surfaces at 46, 47 in order to hold the dumping truck drawbar in locked position.

As shown in Fig. 1, the rock shaft 48 is connected by means of a universal joint 49 to the actuating rod 50 which is provided with a handle 51 within easy reach of the operator at the right-hand end of the spreader, as viewed in Fig. 1. Secured to the upper front edge portion of the hopper is a bracket plate 52 provided with an opening for receiving the rod 50 so that the latter may have a journal support to co-operate with the universal joint 49 to support the rod 50 in the position shown in Fig. 1. Secured to the rod 50 is a bracket plate 53 to which is connected a spring 54 the lower end of which is secured below the bottom of the hopper near the right-hand end thereof as viewed in Fig. 1.

It can readily be seen by referring to Fig. 1 that when the rod 50 is rotated by means of the handle 51 in an anti-clockwise direction as viewed by the operator, the latch plates 42, 43 will be moved downwardly into positions to release the dumping truck drawbar. When the handle 51 is released, the spring 54 will automatically return the latch plates to the position shown in Figs. 2 and 3. When the hitching devices are at a proper elevation from the road surface, the spreader may be pushed forward so that the beveled surfaces 44 and 45 of the latch plates will engage the dumping truck drawbar whereupon the latch plates will be automatically depressed against the action of the spring 54 until the drawbar is in the desired position, whereupon the spring 54 will snap the latch plates into their locking positions.

In order to enable the drawbar to be secured to the rear end of the dumping truck at fixed elevation relative to the road surface and to save the time necessary to adjust the elevation of the drawbar relative to the road surface, I have provided means for adjusting the elevations of the hitching devices so as to be in accordance with the elevation of the drawbar on the dumping truck. Secured to and depending from a cross-piece 31 of the pivoted U-shaped frame structure are spaced-apart bracket plates 55, 55 between which is swiveled a nut 56, as shown in Fig. 1. Threaded through the nut 56 is the upright screw-threaded shaft 58. At the upper end of the screw-threaded portion of the shaft 58 is a collar for supporting the double arm bracket 60. Immediately above the collar the shaft 58 is journaled in the lower end of the bracket 60. To the upper end of the shaft 58 is keyed a bevel gear 61 which meshes with another bevel gear 62 keyed to the shaft 63, the ends of which are journaled in the bearings 64, 65 at the upper end portion of the bracket 60, as shown in Figs. 1 and 4.

The outer ends of the journal bearings 64, 65 are in turn journaled in openings in the plates 66, 67, as shown in Fig. 1. The plates 66, 67 are rigidly secured to the bottom plate 21 of the hopper.

By means of a universal joint 69, the shaft 63 is connected to the actuating rod 70. The rod 70 may be extended through an opening in one of the lateral end walls of the hopper to an actuating handle 71 shown in Fig. 3.

Secured to the under side of the hopper are the bracket plates 76, 77, as shown in Fig. 1. Bolted at 78, 79 to the bracket plates 76, 77 are the journal bearings 80, 81 for the inwardly extending supporting wheel shafts 82, 83. The wheels 12 and 13 are keyed to the shafts 82 and 83 to rotate therewith.

The outer ends of the shafts 82 and 83 are journaled in bearings 84, 85 which are secured to the end walls of the elongated hopper. Bearing against the inner wall of the end plate 86 of the hopper is a collar 88 which is secured to the shaft 82 by means of a set screw, as shown in Fig. 1.

Splined to the outer end of the shaft 82 is a jaw clutch element 90, as shown in Fig. 1. Associated with the jaw clutch element 90 is a slip clutch element 91 which is loosely journaled on the shaft 82. The slip clutch element 91 is connected to the sprocket 92. As shown in Fig. 2, the sprocket 92 is connected by means of the sprocket chain 93 to the sprocket 94 secured to the shaft 95 of the feed roll 20. A shipper 96 is connected to the jaw clutch 90, as shown in Figs. 1 and 2. Intermediate the ends of the shipper is a pivotally connected link 97 the inner end of which is pivotally connected to a bracket 98 on the outer wall of the hopper end plate 86. To the upper end of the shipper 96 is pivotally connected a rod 99 which is adapted to extend under the bottom plate 21 to the other end of the spreader within easy reach of the operator. As shown in Fig. 3, the rod 99 is pivotally connected to the lower end of a shifting lever 100 which is fulcrumed at 101 to the outer side of the hopper end plate 87.

The right-hand end of the shaft 83, as viewed in Fig. 1, is connected through reversing gearing 102, 103 to a shaft on which is splined a jaw clutch element 104. Associated with this jaw clutch element is a slip clutch element 105 which is connected to the sprocket 106. By means of a shipper 107 connected to the jaw clutch element 104, the latter may be moved into or out of engagement with the slip clutch element 105. The shipper 107 comprises two plates between which extends the fulcrum element 108 on the outer wall of the hopper end plate 87. A spring 109 holds the resilient straps of the shipper 107 in frictional engagement with the mounting 108 so that when the operator releases the handle 110, the clutch will remain applied or released.

As shown in Fig. 3, the sprocket 106 is connected by means of the sprocket chain 111 to the sprocket 112 on the feed roll shaft 95. Reinforcing plates 113 and 114, as shown in Figs. 2 and 3, may be used for securely mounting the journal bearings for the roller shaft 95 in desired association with the discharge opening in the bottom of the hopper.

It should be particularly noted that the feed roll 20 always rotates in delivery direction whether the spreader is moved forwardly or rearwardly along the roadway. That is to say, the feed roll 20 always rotates in the direction of the arrow shown in Fig. 3 or in the direction of the arrow shown in Fig. 2, irrespective of the direction of travel of the spreader. When the spreader is pulled forwardly or to the left, as viewed in Fig. 3, the clutch element 104 will be rotated in a clockwise direction as viewed from the right-hand end of Fig. 1. When the handle 110 is moved away from the plate 87, the clutch element 104 engages the jaw clutch 105 and the sprocket 106 will be rotated in the direction of the arrow shown in Fig. 3 and consequently the feed roll 20 will be rotated in a clockwise direction as viewed in Fig. 3.

When the spreader is moved rearwardly with the clutch elements 104 and 105 still in engagement, the clutch element 104 will be automatically slipped off the clutch element 105. Only by throwing in the clutch 90, 91 can the feed roll 20 be rotated when the spreader is moved rearwardly. By moving the lever 100 away from the plate 87, the rod 99 will be pushed to the left as viewed in Fig. 1, and the clutch elements 90, 91 brought into engagement, whereupon the rearward rotation of the wheels 12 will cause anti-clockwise movement of the sprocket 92, as viewed in Fig. 2, and this will effect rotation of the feed roll 20 in an anti-clockwise direction as viewed in Fig. 2 or in a clockwise direction as viewed in Fig. 3. It will thus be seen that the feed roll 20 will always be rotated in feeding direction whether the spreader is moved forwardly or rearwardly.

Uniformity of direction of rotation of the feed roll 20 is taken advantage of in securing rotation of the conveyor 115 always in the same direction, irrespective of the direction of travel of the spreader along the roadway. Moreover, the slip clutch 116 assures uniformity of rotation of the conveyor 115. The sprocket chain 111 is extended around the sprocket 117, as shown in Fig. 3. Connected to the sprocket 117 to rotate therewith is a slip clutch element 118. The jaw clutch element 119 is splined to the shaft 120 of the rotary agitator 115. By means of a loop handle 121, the clutch element 119 may be applied or released.

It can readily be seen by referring to Figs. 1 and 3 that since the feed roll 20 always rotates in the same direction, the sprocket 117 will always be rotated in a clockwise direction as viewed from the right-hand end of Fig. 1. Such direction of rotation is desirable because the rotary conveyor 115 comprises diagonally extending paddles 122, 123 so distributed and arranged as to convey some of the material from the middle of the hopper toward the outer lateral ends thereof. Such conveying action in opposite directions from the middle of the hopper is desirable, particularly when the hopper is elongated on both sides of the path of travel of the towing truck. The feed roll 20 may therefore be termed an actuator for this purpose. In other words, when the load carrying body of the dumping truck is tilted to dumping position, such body is narrow relative to the transverse length of the hopper. As the material is received from the dumping truck, the spread of such material to the lateral ends of the hopper is greatly facilitated by the conveying action of the rotary conveyor 115.

Inasmuch as the hopper is elongated across the roadway, the rotary conveyor 115 is journaled not only in the end plates of the hopper but also in one or more spaced-apart vertical reinforcing plates 126, 127 and 128, as shown in Fig. 4. The vertical reinforcing plates 126, 127 and 128 are welded at their ends to inner walls of the hopper, but it should be particularly noted that these reinforcing plates are shallow in depth and are located intermediate the bottom and top of the hopper. The middle reinforcing plate 127 may support the journal bearing 127' for the shaft 120 of the rotary conveyor 115. Therefore, the conveyor 115 extends under the plates 126 and 128 and the shaft of the conveyor is journaled in the bearing 127' carried by the reinforcing plate 127. U-shaped loops 129 and 130 may be welded to the plates 126 and 128 to form lifting eyes to facilitate assembly or transportation.

Further reinforcement of the hopper may be effected by providing a pipe 131 along the entire length of the rear edge of the hopper, this pipe being welded at its ends to the end plates 86, 87 and also welded along its length to the rear upper edge of the rear inclined wall 132. Reinforcing pipes 133, 134 may be welded to the upper edges of the plates 135 and 136. Hinged at 137, as shown in Fig. 2, is a sheet 138 of flexible material, such as rubber, to close the open space afforded by the cut-away portion 139 of Fig. 4. Near such cut-away portion additional support for the pipes 133 and 134 may be afforded by plate supports, shown at 140 in Fig. 1.

Handle bars 142 and 143 are connected to the front portions of the end plates 86, 87 to extend forwardly along opposite sides of the dumping truck. Even after hitching has been effected, the screw shaft 58 may be rotated so as to tilt the hopper on the axis of the wheels 12, 13. By referring to Fig. 1, it will be seen that if the hitching mechanism remains at fixed relation by reason of the dumping truck drawbar being at fixed elevation, operation of the screw shaft 58 will tilt the hopper and therefore vary the elevation of the feed roll 20. However, the main purpose of the mechanism for adjusting the elevation of the hitching mechanism is to accommodate the hitching mechanism to whatever height the drawbar of the towing truck may be, and in this way maintain the upper open side of the hopper approximately horizontal for maximum capacity when receiving material from the dumping truck.

Fig. 5 shows a modified conveyor 115' comprising a shaft 120' with spiral blades 144 and 145. The journal bearing 128' for the shaft 120' may be attached to the center reinforcing plate 127. When the conveyor 115' is rotated in a clockwise direction, as viewed from the right-hand end of Fig. 5, the spiral blades 144 and 145 will convey material in opposite directions away from the plate 127 and therefore toward the end plates 86, 87 of the hopper.

I will now describe the mechanism for adjusting the rate of feed from end to end of the feed roll. The valve plate or feed gate 146 is located directly above the feed roll 20, as shown in Fig. 2, and extends over the full length of the feed roll between the end plates 86, 87 of the hopper. The valve plate has a vertical portion 147 and an inwardly inclined portion 148, as shown in Fig. 2. The vertical portion 147 overlaps the outer lower edge of the vertical wall 132' which extends downwardly from the inclined wall 132 of the hopper.

Secured rigidly to the ends of the valve plate 146 are outwardly projecting bars. These bars extend through brackets 152 and 153 mounted on the rear edges of the hopper plates 86, 87 to form slots or vertical guideways. Pins 154 and 155 extend outwardly from the ends of the bars through blocks 156 and 157 which in turn are pivoted at 158, 159, respectively, to lifting straps 160 and 161, as shown in Figs. 2 and 3. At the upper ends of the straps 160 and 161 are nuts 162, 163 through which are threaded the vertical rods 164, 165, the shafts of which are journaled at 166 and 167 to levers or arms 168, 168 and 169, 170, which in turn are rigidly connected to the rock shaft 141, as shown in Fig. 4.

The journal bearing 167 is pivotally mounted between the arm 170 and the lever 169. The arm 170 is fixed at its right-hand end as viewed in Fig. 3, to the rock shaft 141. The arm 170 extends radially from the rock shaft 141 in parallelism with the lever 169.

The lower fulcrum end of the lever 169 is rigidly connected to one end of the rock shaft 141 which is journaled and held in the slot 172 in the end plate 87 by the keeper 172'. The opposite end of the rock shaft 141 is journaled and held in the slot 173 in the plate 86 by the keeper 173' and is rigidly attached to the arms 168, 168. Between the arms 168, 168 at their free ends is pivotally supported the journal bearing 166, as shown in Figs. 2 and 4.

It will thus be seen that when the lever 169 is lifted or lowered from the right-hand end of the spreader, as viewed in Figs. 1, 3 and 4, both ends of the valve plate 146 are lifted or lowered equally relative to the feed roll 20.

The lever 169 is provided with an inwardly extending latch 174 which is adapted to fit in any of the notches 175 of the arcuate plate 176 secured to the hopper plate 87, as shown in Fig. 3. The lever 169 extends between the guide rod 177 and the arcuate notched plate 176.

After equal adjustment has been made of both ends of the valve plate relative to the feed roll 20 by quick movement of the lever 169, the valve plate may be held in such adjusted position by the latch 174 fitting in one of the notches 175. More accurate adjustment, however, may be made by means of the screw shafts 164 and 165 at the opposite ends of the spreader, either to secure uniform feed over the entire length of the feed roll or to secure greater feed from one end portion of the feed roll than from the other end portion thereof. By means of the handles 178 and 179, as shown in Figs. 2 and 3, the ends of the valve plate may be lifted or lowered individually and therefore one end or the other of the valve plate may be moved farther away or closer to the feed roll. After the adjustment of the valve plate has been made in inclination or parallelism relative to the feed roll, the valve plate as a whole may be lifted or lowered by means of the lever 169 from the right-hand end of the spreader, as viewed in Fig. 1. For instance, the valve plate may be adjusted so that the feed may be greater on one side of the road than on the other, and then the quantity of feed may be regulated by actuating only the lever 169 without further actuation of either of the handles 178, 179.

It should be understood that while the rock shaft 141 fits into the slots 172 and 173 in the end plates 87 and 86, respectively, as shown in Figs. 2 and 3, the keeper plates 172' and 173' are bolted to the plates 87 and 86, respectively, and consequently such keeper plates form journal bearings for the ends of the shaft 141 and the axis of the latter is fixed relative to the hopper. When the lever 169 is moved up or down the journal bearings 166, 167 move in parallel arcs on the shaft 141 as a center. The journal bearings 166, 167 are swiveled to the arms 168, 168 and 169, 170, respectively, and the straps 160, 161 are pivoted at 154, 155 and therefore the rods 164, 165 may sway back and forth as the lever 169 is swung up and down.

The adjustment of the lower edge of the gate 146 relative to the feed roll may be indicated by observation of the gate adjusting mechanism mounted on the outer surfaces of the plates 86 and 87. The brackets 152 and 153 form positive limits to the lowering and raising of the straps 160 and 161 and consequently of the end portions of the gate 146. Although Figs. 2 and 3 show the gate 146 near its lowermost limit at both ends it should be understood that the extension 148 may have its lower edge brought into contact or nearly so when the blocks 156, 157 are at their lowermost limits. By turning the handle 178 the block 156 may be lifted to such point as indicates the maximum desired distance between the gate extension 148 and the feed roll 20. In like manner by turning the handle 179 the height of the block 157 may be adjusted to indicate the desired maximum distance between the gate extension 148 and the feed roll 20 near the plate 87. Then by moving the lever 169 down from the position shown in Fig. 3, the distance between the gate 146 as a whole from the feed roll may be indicated by the notch 175 where the latch 174 is located. The actuation of the lever 169 operates to lift and lower both ends of the gate simultaneously and equally. The adjustment of the end portions of the gate at different distances from the feed roll is desirable for road crowning purposes. For instance, it may be desired to spread a layer of material which shall increase in depth gradually from the center of the roadway to either side thereof adjacent the shoulder or berm. However, when desired, equal adjustments of the end portions of the gate from the feed roll will secure the spreading of a layer of material of equal depth throughout.

The hopper feed control or mechanism, including the valve plate or feed gate 146, for adjusting the rate of feed from end to end of the feed roll, is described and claimed in my copending application, S. N. 380,681, filed Feb. 26, 1941, for an improvement in Material spreaders.

Obviously those skilled in the art may make various changes in the details and arrangements of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A material spreader comprising the combination with an elongated hopper having an open top extending throughout its length and projecting beyond both sides of the path of travel of a dumping truck, of supporting wheels set inwardly from the lateral ends of the hopper, means at a discharge opening in the bottom of the hopper for discharging material along the path of the truck and substantially along both sides thereof, the discharge opening being coextensive laterally of such path with the lateral elongation of the opening in the top of the hopper, and the material dumped from the truck being free to spread laterally along such top toward both lateral ends of the hopper, a rotary conveyor having mechanism in the hopper spaced from said discharge opening for conveying material from the middle of the hopper toward both lateral ends thereof to assist in the spreading of the material into said hopper when dumped from the truck, and mechanism comprising a slip clutch between one of the wheels and said conveyor to effect rotation of the latter only for such conveying directions.

2. A material spreader comprising the combination with an open top hopper having a discharge opening in its bottom, of a rotary actuator extending to opposite ends of the hopper, spaced-apart ground engaging wheels for supporting said hopper, driving connections comprising a reverse slip clutch between one of said wheels and said actuator to rotate the latter when the hopper is moved forwardly along a roadway, said clutch being automatically released when the direction of travel of the hopper is reversed, additional driving connections comprising another reverse slip clutch between another of said wheels and said actuator to rotate the latter in the same direction when the hopper is moved rearwardly along the roadway, said last-named clutch being automatically released when the direction of movement along the roadway is reversed, a rotary conveyor in the hopper spaced from said discharge opening, and a driving connection between the actuator and the conveyor to secure rotation of the latter always in the same direction irrespective of the direction of travel of the hopper.

3. In a material spreader, the combination with an elongated hopper having an open top, of mechanism for flexibility hitching such spreader to a dumping truck, supporting wheels set inwardly from the lateral ends of the hopper in position to track the wheels of the dumping truck, said hopper extending laterally of the roadway beyond the path of the truck, an elongated conveyor in the hopper spaced upwardly from the bottom thereof in position to convey material toward the lateral ends of the hopper, separate driving mechanisms connected between said wheels and said conveyor and comprising reversely arranged clutches, lever operated devices one associated with each clutch for applying and releasing the same, only one of said clutches being effective when the hopper travels either forwardly or rearwardly so that said conveyor will always be rotated in the same direction to assure conveying action toward the lateral ends of the hopper, and means for effecting spreading of the material from the hopper onto the roadway.

4. In a material spreader, the combination with an open top hopper having a discharge opening in its bottom, of coupling mechanism adapted to connect said hopper to a draft vehicle, spaced-apart wheels for supporting said hopper with its lateral ends projecting laterally of the roadway beyond the path of travel of the draft vehicle, mechanism in the hopper for conveying material therein toward the lateral ends of the hopper, driving connections comprising reverse slip clutches between said wheels and the said conveying mechanism to effect operation of the latter always in the same conveying direction relatively to the lateral ends of the hopper whether the draft vehicle pulls or pushes the spreader along the roadway, and mechanism for spreading material from said hopper onto the roadway.

5. In a material spreader, the combination with a hopper having an open top and a discharge opening in its bottom, of means for spreading material from said hopper through said discharge opening, ground engaging wheels for supporting said hopper, elongated conveying mechanism in said hopper and spaced above said discharge opening, and driving means connected to said conveying mechanism to effect the operation thereof during the spreading of the material as aforesaid.

6. In a material spreader, the combination with a hopper, of ground engaging wheels for supporting the same, a conveying device mounted in said hopper in a position spaced above the bottom discharge opening in said hopper, means for effecting spreading of material from said hopper through said discharge opening, and mechanism comprising a slip clutch adapted to drive said conveying device only in one direction relatively to said hopper, said clutch being automatically released when the direction of movement of the hopper is reversed.

7. In a material spreader, the combination with an open top hopper having a discharge opening in its bottom, of a rotary conveyor associated with said hopper, spaced-apart ground engaging wheels for supporting said hopper, coupling mechanism adapted to connect said hopper to a draft vehicle, driving connections comprising a reverse slip clutch between one of said wheels and said rotary conveyor to drive the latter in a predetermined direction when the hopper is moved forwardly, said clutch being automatically released when the direction of movement of the hopper is reversed, additional driving connections comprising another reverse slip clutch between another of said wheels and said rotary conveyor to drive the latter in the aforesaid predetermined direction when the hopper is moved rearwardly, said last-named clutch being automatically released when the direction of movement of the hopper is reversed, and manual means for individually applying said clutches.

8. In a material spreader, the combination with a hopper, of spaced-apart wheels for supporting said hopper, a rotary conveyor associated with said hopper, separate driving mechanisms connected between said wheels and said rotary conveyor and comprising reversely arranged clutches, and separate devices one associated with each clutch for applying and releasing the same, only one of said clutches being effective when the hopper travels either forwardly or rearwardly, either clutch when effective being automatically released when the direction of movement of the hopper is reversed.

9. In a material spreader, the combination with an open top hopper having a discharge opening in its bottom, of a rotary conveyor associated with said hopper, coupling mechanism adapted to connect said hopper to a draft vehicle, spaced-apart wheels for supporting said hopper, and driving connections comprising reverse slip clutches between said wheels and said rotary conveyor to effect rotation of the latter always in the same direction relatively to the hopper whether the draft vehicle pulls or pushes the spreader along the roadway.

10. In a material spreader, the combination with an open top hopper having a discharge opening in its bottom, of spreading mechanism associated with said discharge opening, coupling mechanism adapted to connect said hopper to a draft vehicle, spaced-apart wheels for supporting said hopper, an elongated conveying device in said hopper, driving connections comprising reverse slip clutches between said wheels and said conveying device to effect rotation of the latter always in the same direction relatively to the hopper whether the draft vehicle pulls or pushes the spreader along the roadway.

11. In a material spreader, the combination with a hopper, of ground engaging wheels for supporting the same, spreading mechanism associated with a discharge opening in the bottom of the hopper, conveying means in the hopper and spaced above said spreading mechanism, and driving means for the spreading mechanism and said conveying means to secure spreading of material from said hopper while said conveying means transfers material in the hopper to facilitate action thereon by said spreading mechanism.

12. In a material spreader, the combination with a hopper, of spaced-apart wheels for supporting said hopper, spaced-apart rotary members one of which is a feed roll and the other a conveyor each associated with said hopper, separate driving mechanisms connected between said wheels and said rotary members and comprising reversely arranged clutches, and separate devices one associated with each clutch for applying and releasing the same, only one of said clutches being effective when the hopper travels either forwardly or rearwardly, the construction and arrangement being such that each rotary member always maintains its own predetermined direction of travel irrespective of the direction of travel of the hopper, either clutch when effective being automatically released when the direction of movement of the hopper is reversed.

13. A material spreader comprising the combination with a hopper, of spaced-apart wheels for supporting said hopper for travel along a roadway, a conveyor spaced above a discharge opening in the hopper and adapted to act on material in the hopper above such discharge opening, automatic means operable by movement of the spreader along the roadway for compelling operation of the said conveyor always in the same direction irrespective of the direction of travel of the hopper, and mechanism for effecting spread of material from the discharge opening in the bottom of the hopper whether the hopper travels in either direction.

14. A material spreader comprising the combination with a hopper, of spaced wheels for supporting said hopper for travel along a roadway, a rotatable reversely arranged paddle conveyor spaced above a discharge opening in the hopper and adapted to act on material in the hopper above such discharge opening, rotatable feeding mechanism at the discharge opening in the bottom of the hopper, means for driving said feeding mechanism when the hopper travels in one direction, separate means for driving the feeding mechanism in reverse direction when the hopper travels in the opposite direction, and means for effecting rotation of said paddle conveyor in the same direction whether the hopper travels forwardly or rearwardly on said wheels.

15. A material spreader comprising the combination with a hopper, of mechanism for supporting the hopper for travel along a roadway, a rotatable reversely arranged screw conveyor in the hopper spaced from the discharge opening thereof, a rotatable feeding device associated with said discharge opening, driving mechanism connected to said feeding device for operation by movement of the hopper along the roadway to compel the said feeding device to always rotate in the same direction irrespective of the direction of travel of the hopper along the roadway, mechanism comprising a slip clutch for connecting said feeding device to said screw conveyor, and manual means for applying said clutch, the construction and arrangement being such that the screw conveyor will be compelled to rotate only in one direction and when said slip clutch is applied the conveyor will be rotated in the same direction irrespective of the direction of travel of the hopper.

16. A material spreader comprising the combination with an open top hopper having a discharge opening in its bottom, of spaced wheels for supporting said hopper, a rotatable conveyor having reversely arranged conveying means extending from the middle of the hopper to the lateral ends thereof and spaced upwardly from said discharge opening, means operated by rotation of said wheels for compelling rotation of said conveyor always in the same direction irrespective of the direction of travel of the hopper, and feeding mechanism associated with said discharge opening and connected to said rotating means for operation thereby.

17. A material spreader comprising the combination with a hopper having a bottom discharge opening, of wheels for supporting said hopper for travel in either direction along a roadway, a rotatable conveyor mounted in the hopper above said discharge opening to spread material towards the ends thereof, feeding and spreading means associated with said discharge opening, and mechanism comprising one-way slip clutches to drive said conveyor always in the same direction irrespective of the direction of travel of the hopper along the roadway as automatically compelled by said slip clutches thereby enabling said hopper to be moved in either direction along the roadway with assurance that the material in the hopper will always be spread by the conveyor toward the ends of the hopper whether the hopper travels in one direction or the other.

18. A material spreader comprising the combination with a hopper having a bottom discharge opening, of a rotary conveyor in the hopper spaced from said discharge opening, feeding and spreading means associated with said discharge opening, mechanism for supporting said hopper for travel along a roadway forwardly or rearwardly, and driving means connected to said feeding and spreading means and to said rotary conveyor, said driving means including automatic mechanism operable by movement of the spreader along the roadway to prevent reverse rotation of said conveyor thereby automatically compelling the rotation of said conveyor always in the same direction whether the hopper travels forwardly or rearwardly along the roadway.

19. A material spreader comprising the combination with a hopper having a bottom discharge opening, of wheels for supporting said hopper for travel along the roadway in either direction, a discharge device associated with said discharge opening, a rotary material conveying device spaced above said discharge device in position to convey material in the hopper towards the opposite lateral ends thereof, and automatic means dependent on movement of the spreader along the roadway for compelling rotation of said material conveying device always in the same direction irrespective of the direction of travel of the spreader along the roadway.

20. A material spreader comprising the combination with a hopper, of spaced wheels for supporting said hopper, a rotatable screw conveyor in the hopper in position to spread material toward the lateral ends of the hopper, a rotatable actuator, separate driving mechanisms between said wheels and said actuator and comprising reversely arranged slip clutches, a driving connection between said actuator and said conveyor, and manually operated devices one associated with each clutch for applying the same, only one of said clutches being effective when the hopper travels either forwardly or rearwardly, the other being automatically released, the conveyor being always driven in the same direction by travel of the spreader along the roadway since said actuator is always driven in the same direction whether the spreader travels forwardly or rearwardly, operation of the conveyor being dependent on the rolling of said wheels along the roadway.

FRANKLIN E. ARNDT.